United States Patent
Mazur et al.

(10) Patent No.: US 10,543,907 B2
(45) Date of Patent: Jan. 28, 2020

(54) FLOW CONTROL TECHNIQUE BY DIELECTRIC MATERIALS

(71) Applicant: CALIFORNIA INSTITUTE OF TECHNOLOGY, Pasadena, CA (US)

(72) Inventors: Paul Mazur, Pasadena, CA (US); Kaushik Bhattacharya, La Canada, CA (US); Beverley McKeon, Tujunga, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 504 days.

(21) Appl. No.: 15/202,536

(22) Filed: Jul. 5, 2016

(65) Prior Publication Data

US 2017/0008615 A1 Jan. 12, 2017

Related U.S. Application Data

(60) Provisional application No. 62/188,927, filed on Jul. 6, 2015.

(51) Int. Cl.
*B64C 23/00* (2006.01)
*F15D 1/00* (2006.01)
*F15D 1/12* (2006.01)

(52) U.S. Cl.
CPC ............ *B64C 23/005* (2013.01); *F15D 1/007* (2013.01); *B64C 2230/12* (2013.01); *F15D 1/12* (2013.01); *Y02T 50/166* (2013.01)

(58) Field of Classification Search
CPC ..... B64C 23/005; B64C 2230/12; F15D 1/12; Y02T 50/166
See application file for complete search history.

(56) References Cited

U.S. PATENT DOCUMENTS

| 6,220,549 B1 * | 4/2001 | Tsunoda | B64C 23/005 |
| | | | 114/67 R |
| 8,222,799 B2 * | 7/2012 | Polyakov | G06F 3/0202 |
| | | | 310/365 |

(Continued)

FOREIGN PATENT DOCUMENTS

WO 2006/040532 A1 4/2006

OTHER PUBLICATIONS

Audoly, B. et al. Buckling of a stiff film bound to a compliant substrate (part I). Formulation, linear stability of cylindrical patterns, secondary bifurcations. Feb. 28, 2008. 31 pages.

(Continued)

*Primary Examiner* — Brian M O'Hara
*Assistant Examiner* — Keith L Dixon
(74) *Attorney, Agent, or Firm* — Steinfl + Bruno LLP

(57) ABSTRACT

A multilayered active surface is presented whose rugosity can be controlled by an applied electrical field. Varying the applied electrical field can control the rugosity of the surface which makes contact with a fluid, and thereby can affect instabilities of the boundary layer. A middle layer of the multilayered active surface can be made of a compliant electroactive material. In some cases, a pre-stretch in the middle layer can predefine a rugosity of the multilayered active surface without an applied electrical field, in which case an applied electrical field can further alter the rugosity in both amplitude and spatial periodicity and ultimately result to a smooth surface for a higher value of the applied electrical field. A top layer and a bottom layer are constructed using conductive material and uses as electrodes coupled to a voltage source to generate the electric field that controls the rugosity of the surface.

31 Claims, 8 Drawing Sheets

(56) References Cited

U.S. PATENT DOCUMENTS

| | | | |
|---|---|---|---|
| 8,276,851 B2 | 10/2012 | McKeon et al. | |
| 8,302,904 B2* | 11/2012 | McKeon | B64C 21/10 244/198 |
| 8,424,809 B2 | 4/2013 | McKeon et al. | |
| 9,315,259 B1 | 4/2016 | McKeon et al. | |
| 9,433,537 B2* | 9/2016 | Zelka | H05K 3/207 |
| 2005/0157893 A1* | 7/2005 | Pelrine | B64C 3/48 381/190 |
| 2007/0170822 A1* | 7/2007 | Pei | H01L 41/0536 310/363 |
| 2008/0023589 A1* | 1/2008 | Miles | B64C 23/005 244/205 |
| 2009/0065650 A1 | 3/2009 | McKeon et al. | |
| 2010/0133386 A1* | 6/2010 | Schwimley | B64C 23/005 244/205 |
| 2010/0329838 A1* | 12/2010 | Greenblatt | B64C 23/005 415/1 |

OTHER PUBLICATIONS

Audoly, B. et al. Buckling of a stiff film bound to a compliant substrate (part II). A global scenario for the formation of herringbone pattern. May 23, 2008. 33 pages.

Audoly, B. et al. Buckling of a stiff film bound to a compliant substrate (part III). Herringbone solutions at a large buckling parameter. Dec. 9, 2007. 22 pages.

Chen, X. et al. "Herringbone Buckling Patterns of Compressed Thin Films on Compliant Substrates" Journal of Applied Mechanics, Sep. 2004, vol. 71, pp. 597-603.

Choi, K-S. "Turbulent Drag Reduction using Compliant Surfaces" Proc. R. Soc. Lond., 1997, vol. 453, pp. 2229-2240.

Dorfmann, A. et al. "Nonlinear electroelastostatics: Incremental equations and stability" International Journal of Engineering Science. 2010, vol. 48, pp. 1-14.

Gad-el-Hak, M. "Compliant coatings for drag reduction" Progress in Aerospace Sciences, 2002, vol. 38, pp. 77-99.

Luhar, M. et al. "A framework for studying the effect of compliant surfaces on wall turbulence" J. Fluid Mech., 2015, vol. 768, pp. 415-441.

Suo, Z. et al. "A nonlinear field theory of deformable dielectrics" Journal of the Mechanics and Physics of Solids, 2008, vol. 56, pp. 467-486.

Suo, Z. "Theory of Dielectric Elastomers" Acta Mechanica Solida Sinica, Dec. 6, 2010, vol. 23, No. 6, pp. 549-578.

Tian, L. "Effective Behavior of Dielectric Elastomer Composites" Ph.D. Thesis, California Institute of Technology, Defended Aug. 24, 2007. 147 pages.

Zheng, L. "Wrinkling of Dielectric Elastomer Membranes" Ph.D. Thesis, California Institute of Technology, Defended Sep. 11, 2008. 197 pages.

Chen, S. et al. "Constrained large-eddy simulation and detached eddy simulation of flow past a commercial aircraft at 14 degrees angle of attack" Science China: Physics, Mechanics & Astronomy; Feb. 2013 vol. 56 No. 2: pp. 270-276.

Bushnell, D. et al. "Effect of compliant wall motion on turbulent boundary layers" The Physics of Fluids, vol. 20, No. 10, Pt. II, Oct. 1977, pp. S31-S48.

Kramer, M. "Boundary-Layer Stabilization by Distributed Damping" Journal of the Aero/Space Sciences vol. 27, No. 1, May 26, 1959, p. 69.

Carpenter, P.W. "The Optimization of Compliant Surfaces for Transition Delay" Turbulence Management and Relaminarisation, 1988, pp. 305-313.

Allen, H.G. Analysis and Design of Structural Sandwich Panels. Pergamon Press, New York, 1969, pp. 1-13.

Zhang, Q.M., et. al. "Giant Electrostriction and Relaxor Ferroelectric Behavior in Electron-Irradiated Poly(Vinylidene Uoride-Triuoroethylene) Copolymer, *Science*". Jun. 26, 1998, vol. 280, pp. 2101-2104.

Thomsen, D.L., et. al. "Liquid Crystal Elastomers With Mechanical Properties of a Muscle, *Macromolecules*". May 15, 2001, vol. 34, pp. 5868-5875.

* cited by examiner

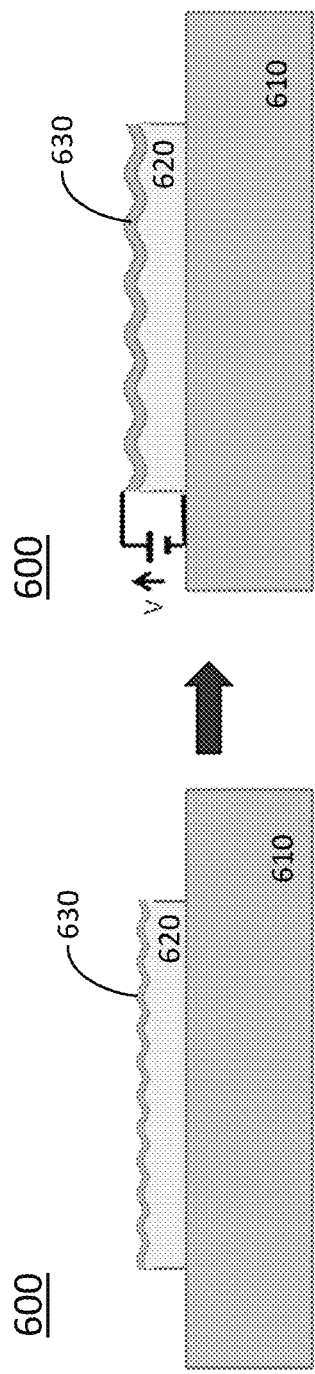

FLOW CONTROL TECHNIQUE BY DIELECTRIC MATERIALS

CROSS REFERENCE TO RELATED APPLICATIONS

The present application claims priority to U.S. provisional Patent Application Ser. No. 62/188,927, filed on Jul. 6, 2015, for "Flow Control Technique by Dielectric Materials", which is herein incorporated by reference in its entirety.

The present application may be related to U.S. Pat. No. 8,276,851, entitled "Control of Aerodynamic Forces by Variable Wetted Surface Morphology", issued Oct. 2, 2012, the disclosure of which is incorporated herein by reference in its entirety. The present application may further be related to U.S. Pat. No. 8,424,809, entitled "Control of Aerodynamic Forces by Variable Wetted Surface Morphology", issued Apr. 23, 2013, the disclosure of which is incorporated herein by reference in its entirety. The present application may further be related to U.S. Pat. No. 9,315,259, entitled "Morphing Surfaces for the Control of Boundary Layer Transition", issued Apr. 19, 2016, the disclosure of which is incorporated herein by reference in its entirety. The present application may further be related to published PCT application WO 2006/040532, entitled "Fluid Flow Control Using Boundary Layer Control", published Apr. 20, 2006, the disclosure of which is incorporated by reference in its entirety.

All references cited in this disclosure are incorporated by reference to the same extent as if each reference had been incorporated by reference in its entirety individually.

BACKGROUND

Technical Field

The present disclosure relates to the field of fluids dynamics, and in particular, to the control of instabilities related to a boundary layer. Some exemplary applications of the present disclosure can relate to the field of aerodynamics, and in particular, to the control of turbulent boundary layer flows as known in the aeronautics industry.

Description of the Prior Art

A critical issue in the aeronautics industry is the energy consumed to deal with turbulent boundary layer flows. This energy consumption occurs not only on the wings of an aircraft but also on the fuselage (e.g. see reference [1] and FIG. 1). The force generated by such turbulent boundary layer flows increases the fuel consumed by the aircraft in each phase of a flight, from takeoff to landing. Thus, in an exemplary case of an aircraft, affecting such turbulent boundary layer flows (turbulent flow, turbulence) can lead to significant reduction in fuel consumption. As known to a person skilled in the art, other applications associated with turbulence modification at a surface of a vehicle subjected to a fluid can include, for example, boundary layer state, such as transition advance and transition delay, augmented or reduced heat transfer, augmented or reduced scalar mixing, separation control and skin friction drag modification.

In the field of hydrodynamics, usage of compliant coatings on surfaces of a ship is one technique that has been explored to reduce (turbulent) drag due to the turbulent boundary layer flows as shown, for example, by the work of Kramer (see reference [5]). The analysis of Bushnell et al. (see reference [2]) and the experimental studies from Choi et al. (see reference [3]) and from Gad-el-Hak (see reference [4]) have led to the conclusion that an appropriate compliant coating is an efficient passive technique to reduce the turbulent drag by delaying laminar to turbulence transition. However, it is known in the art that it is difficult to measure small changes in drag with high accuracy. The state of the art is that there remains a question as to the viability of passive compliant walls for the control of turbulence (due to the multi-scale nature of a transitional boundary layer), whereas their usefulness in delaying the onset of turbulence has been convincingly demonstrated. It is noted that an ideal passive coating to control the boundary layer transition (e.g. turbulence) is dependent on flow conditions, which of course can change.

SUMMARY

It would therefore be desirable to have an active control of characteristics of the compliant coating to address changing flow conditions.

There is an opportunity to design an active surface capable of generating significant turbulence modification at Reynolds numbers (flow conditions) representative of many large-scale engineering applications. Having full active control on compliance and the rugosity (surface roughness) of a surface can allow optimizing the turbulent layer at the surface (e.g. controlling of instabilities of the boundary layer, such as, for example, tripping or delaying of the turbulent flow on the surface), the surface being an entire or a partial surface of an aircraft or other objects/vehicles subjected to a fluid.

The various embodiments according to the present disclosure relate to methods and devices for full active control on compliance and rugosity of surfaces using dielectric materials and in some cases using dielectric elastomers. According to some embodiments of the present disclosure, by using a compliant electrically responsive polymer in a multilayered active surface of a vehicle subjected to a fluid, such active control can allow control of the boundary layer transition, such as, for example, optimizing the delaying of turbulent flow on the vehicle. An exemplary multilayered active surface according to some embodiments of the present disclosure can be developed by combining a stiff layer with a compliant electrically responsive polymer such as a ferroelectric polymer or a dielectric elastomer.

According to a first aspect of the present disclosure, a multilayered active surface configured to permit control of instabilities of a boundary layer of a fluid flow is presented, the multilayered active surface comprising: a top stiff layer comprising a conductive material, the top stiff layer configured to present a surface to the fluid flow; a middle compliant layer comprising an electroactive polymer; and a bottom rigid substrate comprising a conductive material, wherein the top stiff layer and the bottom rigid substrate are coupled to a voltage source, and wherein responsive to application of an electric potential difference through the voltage source between the top stiff layer and the bottom rigid substrate, a rugosity of the surface is modified to permit the control of the instabilities of the boundary layer.

According to a second aspect of the present disclosure, a method for controlling instabilities of a boundary layer of a fluid flow is presented, the method comprising: providing a multilayered electromechanical structure comprising a middle electroactive polymer layer, a top stiff electrode layer and a bottom rigid electrode substrate; applying an electrical potential difference between the top stiff electrode and the bottom rigid electrode substrate; based on the applying, affecting a rugosity of a surface of the multilayered electromechanical structure; presenting the surface of the multilayered electromechanical structure to the fluid flow; based on the presenting, obtaining instabilities of a boundary layer; changing the applied electrical potential difference; based on the changing, modifying the rugosity of the surface; and based on the modifying, controlling the instabilities of the boundary layer.

According to a third aspect of the present disclosure, a method for manufacturing a multilayered active surface configured to permit control of instabilities of a boundary layer of a fluid flow is presented, the method comprising: providing a top stiff layer comprising a conductive material, the top stiff layer configured to present a surface to the fluid flow; providing a middle compliant layer comprising an electroactive polymer; and providing a bottom rigid substrate comprising a conductive material, wherein the top stiff layer and the bottom rigid substrate are coupled to a voltage source, and wherein responsive to application of an electric potential difference through the voltage source between the top stiff layer and the bottom rigid substrate, a rugosity of the surface is modified to permit the control of the instabilities of the boundary layer.

Further aspects of the disclosure are shown in the specification, drawings and claims of the present application.

BRIEF DESCRIPTION OF THE DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 4A shows a configuration where the electrodes are at a same electric potential, and FIG. 4B shows a configuration where the electrodes are at different electric potentials per an applied voltage.

FIGS. 6A and 6B shows a configuration of a multilayered active surface according to the present disclosure comprising a top thin stiff layer made of a conductive material, a middle compliant layer made of a pre-stretched electrically responsive material (e.g. electroactive polymer, dielectric elastomer), and a bottom rigid substrate made of a conductive material, where the top thin stiff layer and the bottom rigid substrate can be used as electrodes to influence a shape of the electrically responsive material of the middle compliant layer, thereby subjecting the top thin stiff layer to a controlled stress creating buckling of the top layer. FIG. 6A shows a configuration where the electrodes are at a same electric potential and a buckling of the top thin stiff layer is created due to the pre-stretch of the middle layer relative to the top thin stiff layer, and FIG. 6B shows a configuration where the electrodes are at different electric potentials per an applied voltage, thereby modifying buckling characteristics of the top layer.

DETAILED DESCRIPTION

Figure 1:
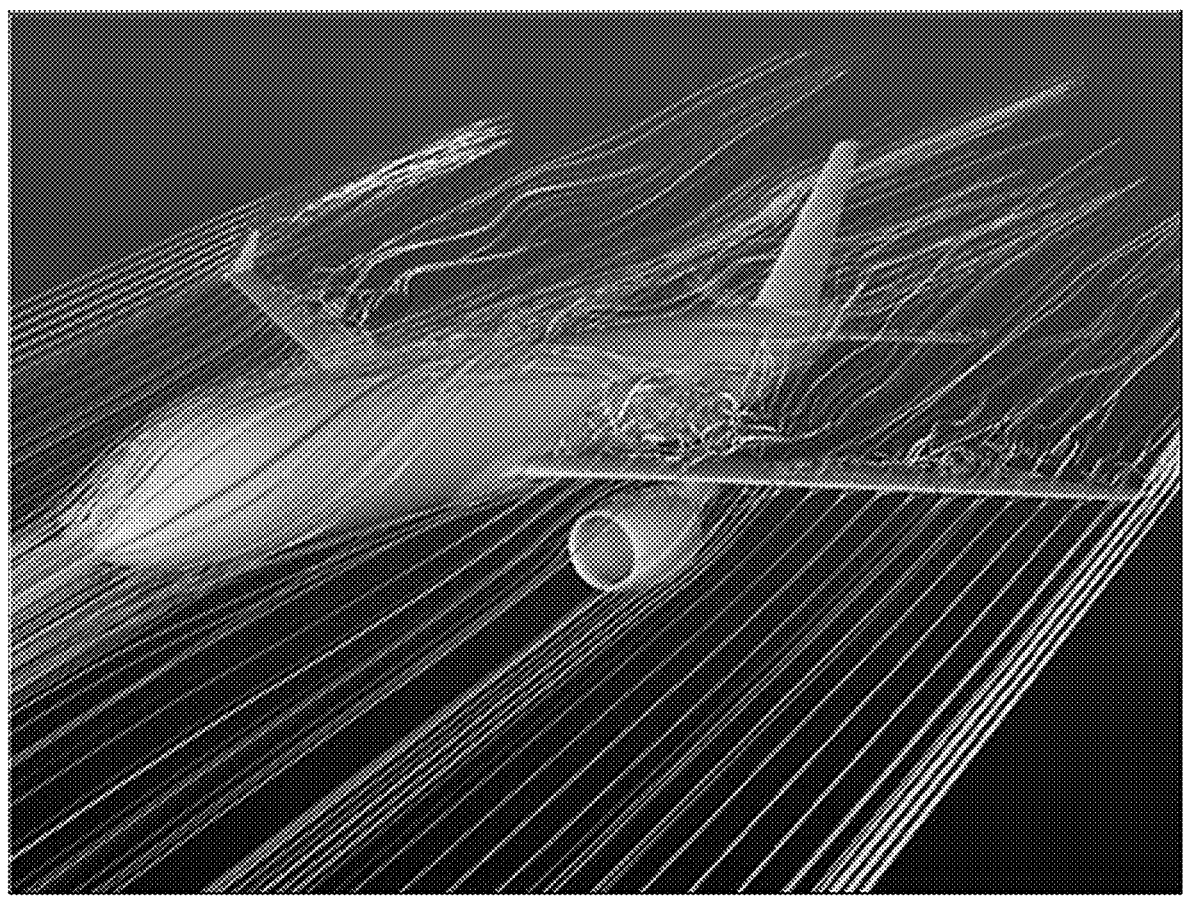
FIG. 1, taken from Chen et al. (reference [1]), shows flow streamlines over an aircraft in contact with a fluid.

Throughout this description, embodiments and variations are described for the purpose of illustrating uses and implementations of the inventive concept. The illustrative description should be understood as presenting examples of the inventive concept, rather than as limiting the scope of the concept as disclosed herein.

As known to a person skilled in the art, turbulent drag can be reduced to some extent by using compliant coatings on rigid walls, where the compliant coatings are slightly deformed by boundary layer flows. Corresponding deformations vary as the flow changes along the coated surface in a temporal or spatial manner. Usage of compliant coatings can result in a passive technique to adapt the shape of the surface in contact with the flow.

The consequences of using such passive technique on the turbulent drag are significant, as illustrated, for example, in an experiment realized by Choi et al. (reference [3]), where a corresponding set up consisted in placing a slender body of revolution into a water tunnel. The parameters measured in this set up were the skin-friction drag, the wall-pressure intensity and the velocity profile obtained by a floating-drag balance, a surface-mounted pressure transducer and a fibre-film probe. By realizing the experiment with both a compliant surface and a rigid surface it was possible to observe reductions, for the case of the compliant surface, of those parameters varying with the water tunnel speeds. In the case of the compliant surface, the reduction of the skin friction drag could reach 7% and the reduction of the wall pressure could reach 19% when compared to the case of the rigid (non-compliant) surface. The experiment of Choi et al. is only one example of several experimental studies that demonstrate a modification of turbulence which can result in a reduction of the turbulent drag when compliant surfaces are used, even if the amplitude of such reduction can vary significantly from one study to another.

Most of the studies on reducing (turbulent) drag due to turbulent flows have been experimental given the difficulties to represent theoretically a turbulent boundary layer flow.

Gad-El-Hak (reference [4]) emphasized that there are no known methods for obtaining solutions to the Navier Stokes equations for a case of a turbulent flow because of the non-linear terms in the equations engender more unknowns and equations instead of reducing the equations. Still a theory is necessary in order to guide the experimental set ups and determine what data are to be measured or controlled.

After Kramer's first experiments, as described in reference [5], theories developed to address turbulent flows were merely partial in nature or limited by different simplifications. For example, Carpenter (reference [6]) was able to determine a parameter to optimize the growth rate of Tollmien-Schlichting instabilities (related to viscosity). A theory according to Carpenter's studies allowed finding optimization criteria for a specific kind of instability by consideration of the surface and the fluid properties.

Luhar et al. (reference [7]) developed a theory showing that the parameters to be minimized in order to reduce turbulent drag are the amplification of the non-linear term of the Navier Stokes equations and/or the Reynolds stress. Given that a turbulent flow is an association of several modes each characterized by a wavenumber and a frequency, a mode by mode optimization is possible in theory. Using Fourier transform of the governing Navier Stokes equations of a single mode, it is possible to model the wall simply using a mechanical admittance relating the wall-normal velocity and wall pressure. More complex models are possible. The compliant-wall interaction with the flow is then represented by particular boundary conditions written with corresponding particular linearized Taylor series expansions. The control of the mechanical admittance allows either to minimize the amplification of non-linear terms of the Navier-Stokes equation or to minimize the Reynolds stress in the small near-wall modes or the very-large-scale motions that exist further from the wall but play a significant role in the turbulence dynamics. This theory supports the fact that specific parameters allow a compliant surface to delay the turbulent drag.

Based on the above body of work, the theory developed to date appears to be able to support the fact that specific parameters allow a compliant surface to affect interaction of a fluid with the surface, and therefore to affect instabilities which characterize the boundary layer. However, compliant surfaces used in the prior art constitute a passive way to affect such instabilities of the boundary layer. On the other hand, an active surface according to the various embodiments of the present disclosure has the advantage of providing controlled deformations of the surface that allows specific selection of a type of instability of the boundary layer to be reduced, therefore tuning to an instability of interest, as well as to control a region of the surface where such instability is to be reduced.

Figure 2:
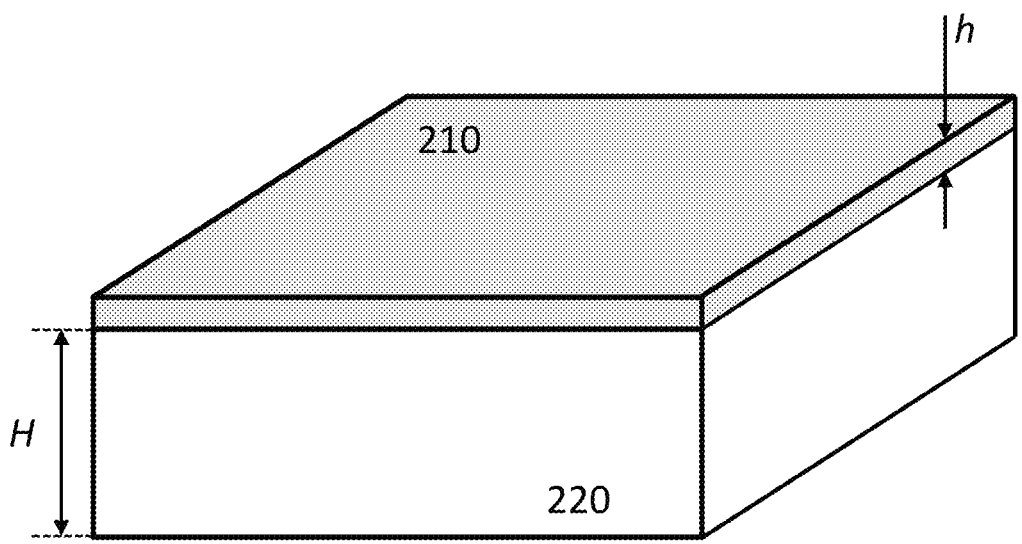
FIG. 2, taken from Audoly and Boudaoud (reference [15]), shows a multilayered structure comprising a top thin layer made of a stiff material, and a bottom thick layer made of a compliant material. Audoly and Boudaoud (reference [15]) study a buckling effect of the top thin layer when the multilayered structure is submitted to a particular stress.
Figure 3:
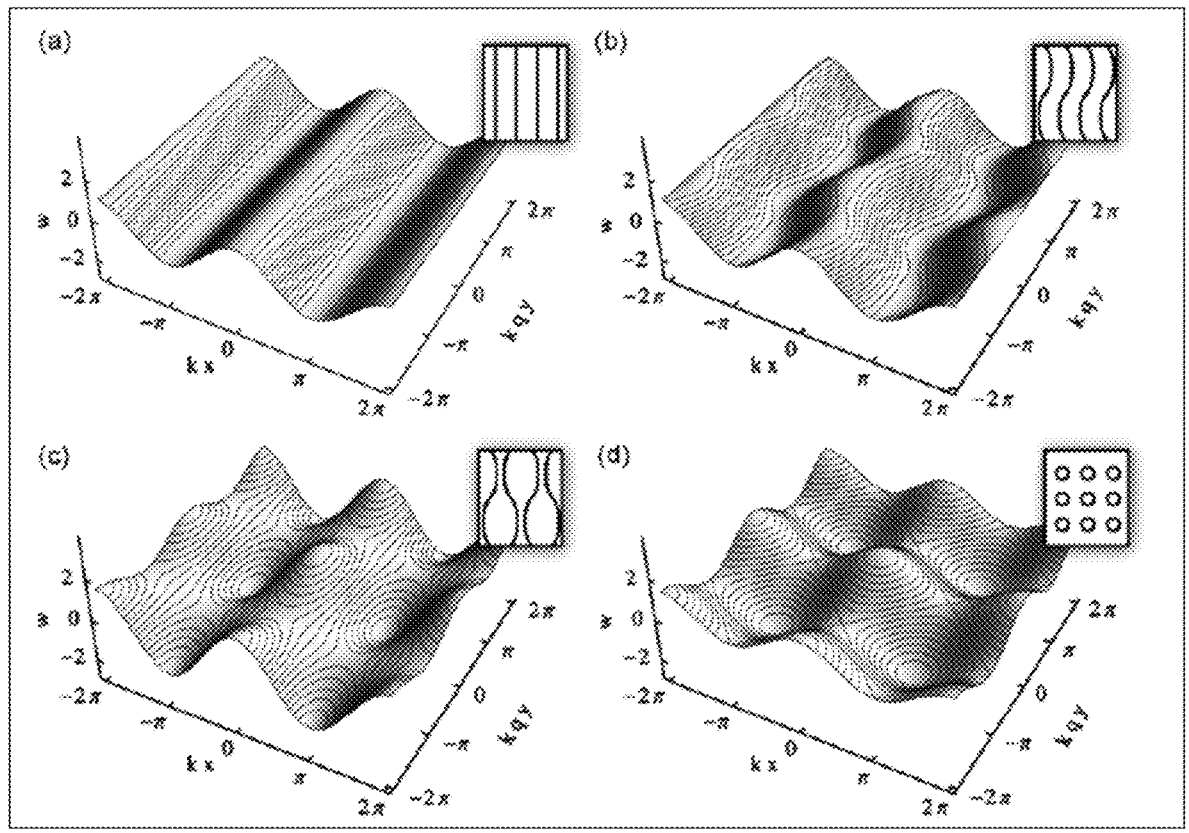
FIG. 3, taken from Audoly and Boudaoud (reference [15]), shows a straight cylindrical pattern (a), an undulating cylindrical pattern (b), a varicose pattern (c), and a checkerboard pattern (d), which are four possible patterns for deflection of the surface of the multilayered structure shown in FIG. 2 resulting from the buckling effect of the top thin layer.

In recent years the buckling of a multilayer structure comprising a stiff layer on a compliant elastomer has been the subject of a number of studies. As used herein, the terms "stiff" and "compliant" refer to the propensity of a material to change shape when subjected to a force. A stiff material is able to resist the force and hold its shape while a compliant material easily changes shapes. It is noted however, that a thin structure made of a stiff material can be flexible. Technically, a stiff material is one that resists strain, which is a measure of how much deformation one has, and buckling of a thin layer of still material can cause an apparent change of a shape of the layer but very little strain because of the thinness. As used herein, the term "rigid" refers to an ideally stiff material that does not change shape when subjected to a force. It is however noted that the term rigid can also be used for a stiff material, as "stiffness" and "rigidity" are relative terms. Stiffness is often characterized by the elastic of Young's modulus: a stiff material typically have a Young's modulus of 1-100 GPa while a compliant material typically has a Young's modulus of 0.1-10 MPa. Consider the multilayer structure (200) shown in FIG. 2, comprising a thin (stiff) layer (210) made of a stiff material, like for example, a metal, and having a thickness h, on a (relatively) thick (compliant) layer (220) of compliant material, like for example, an elastomer, having a thickness H. It is assumed that the thickness H of the layer (220) is orders of magnitude larger than the thickness h of the layer (210). Typically, a value of the thickness h of the thin layer is in a range of 1-100 μm while a value of the thickness H of the thick layer is in a range of 1-100 mm. If the multilayer structure (200) is subjected to a temperature increase, the stiff layer (210) is found to buckle in a number of interesting patterns, as shown in FIG. 3. Broadly speaking, the stiff metal layer (210) expands more than the compliant elastomer layer (220) and is therefore subjected to compressive stresses resulting in buckling of the stiff metal layer (210). Such buckling effect of the multilayer structure (200) has already been investigated with the work of Allen (reference [13]) in 1969. However, it has been a subject of rigorous analysis in recent years by, for example, Chen and Hutchinson (reference [14]) and by Audoly and Boudaoud (references [15, 16, 17]) amongst others. It has been shown that a number of different types of geometrical patterns for deformations of the thin layer (210) resulting from the buckling effect are possible, the type of geometrical pattern being dependent on the mismatch of strain between the stiff layer (210) and the compliant layer (220). These patterns are illustrated in FIG. 3, and include pattern (a): straight cylindrical deformations, pattern (b): undulating cylindrical deformations, pattern (c): varicose deformations, and pattern (d): checkerboard (or herringbone) deformations.

Over the recent years, a number of compliant electrically responsive materials, compliant active materials, compliant actuators or artificial muscles have been the subject of intensive research. These are also referred to as soft electrically responsive materials, soft active materials and soft actuators. Broadly, these are compliant solids, like elastomers and gels, that deform (mechanical deformation) when subjected to electrical fields. These include a range of electroactive polymers (see for example reference [19]), ferroelectric polymers (see for example reference [20]), liquid crystal elastomers (see for example reference [21]) and dielectric elastomers (see for example references [8, 9, 10]). Some embodiments according to the present disclosure use such compliant electrically responsive materials in a multilayer structure, such as the multilayer structure (200) depicted in FIG. 2, which can be used as an active surface to a fluid. By making the compliant layer (220) of such electrically responsive material, deformation of the compliant layer under control of an electric field exerts a compressive force to the thin layer (210) which creates buckling of the thin layer (210) as described above.

Figure 4A:
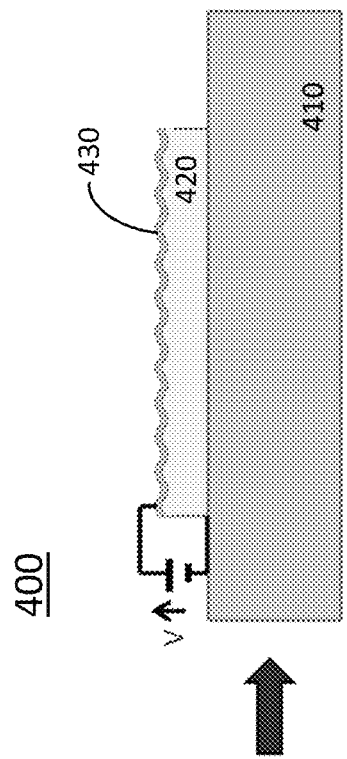
FIGS. 4A and 4B show a configuration of a multilayered active surface according to the present disclosure comprising a top thin stiff layer made of a conductive material, a middle compliant layer made of an electrically responsive material (e.g. electroactive polymer), and a bottom rigid substrate made of a conductive material, where the top thin stiff layer and the bottom rigid substrate can be used as electrodes to influence a shape of the electrically responsive material of the middle compliant layer, thereby subjecting the top thin stiff layer to a controlled stress creating buckling of the top layer.
Figure 4B:
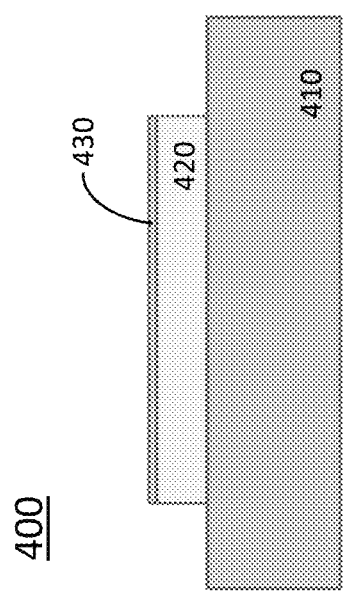

A multilayered active surface (400) according to an embodiment of the present disclosure is depicted in FIGS. 4A and 4B, where a compliant electrically responsive material (polymer) is used as means to control characteristics of deformations on the surface. The active surface (400) according to the present disclosure is an electromechanical multilayer structure (400) comprising a bottom rigid substrate (410), a middle compliant layer (420) made of an electrically responsive material, and a top stiff layer (430) presenting a surface of the electromechanical multilayer structure (400) which can be in contact with a fluid. A person skilled in the art knows of various fabrication/assembly methods and techniques by which the layers (410, 420, 430) can be put together to form the multilayered active surface (400) of the present disclosure. According to a preferred embodiment, the adhesion between the layers is achieved by using precursors and cross-linking in place to form the polymer. Alternately, some compliant polymers are known to naturally adhere to clean stiff surfaces. Alternately still, adhesion can be achieved by using a very thin adhesive layer.

According to some non-limiting exemplary embodiments of the present disclosure, the top stiff layer (430) of the multilayered active surface (400) can be made of a metal, such as copper, nickel and aluminum, or of any other metal or conductive material known to a person skilled in the art. The same materials can also be used for the bottom rigid substrate (410), although layers (410) and (430) may be made of different such materials. It should be noted that the bottom rigid substrate (410) can represent part of the main body of a vehicle (e.g. a wing, a fuselage, a spoiler) using the multilayered active surface (400). According to some exemplary embodiments the body is not entirely made of conductive material and the bottom rigid substrate (410) can represent a conductive layer of the body.

According to further non-limiting exemplary embodiments of the present disclosure, the electrically responsive (electroactive) material used for the middle compliant layer (420) of the multilayered active surface (400) can be a ferroelectric polymer, such as, for example, polyvinylidene difluoride (PVDF), or a liquid crystal elastomer, such as, for example, 4'-acryloyloxy butyl 2,5-(4'-butyl oxy benzoyloxy) benzoate, 4'-acryloyloxy butyl 2, and 5-di(4'-butyloxybenzoyloxy)benzoate.

According to some exemplary embodiments of the present disclosure a thickness of the top stiff layer (430) is in a range of about 1-100 μm, a thickness of the middle compliant layer (420) is in a range of about 1-100 mm, and a thickness of the bottom rigid substrate (410) is in a range of about 0.1-10 mm, or alternately, in a range of 0.1-1000 mm. According to further exemplary embodiments of the present disclosure, a ratio between a thickness of the top stiff layer (430) and a thickness of the middle compliant layer (420) can be in a range of values between 1/10 to 1/100.

With continued reference to FIGS. 4A and 4B, according to an embodiment of the present disclosure, the bottom rigid substrate (410) can form a bottom electrode of the structure (400) and the top stiff layer (430) can form a top electrode of the structure, where a voltage across the top and bottom electrodes can induce an electric field in the electrically responsive middle compliant layer (420) of the structure (400).

FIG. 4A shows a configuration of the active surface (400) of the present disclosure where no voltage is applied across the top and bottom electrodes provided by the top stiff layer (430) and the bottom rigid substrate (410). Accordingly, the electrically responsive middle compliant layer (420) is in a relaxed state (resting) and no compressive force is exerted to the top stiff layer (430), resulting in a smooth surface of the active surface (400).

FIG. 4B shows a configuration of the active surface (400) of the present disclosure where an electric potential difference (e.g. voltage V) is applied between the top and bottom electrodes provided by the top stiff layer (430) and the bottom rigid substrate (410). Such electric potential difference, V, can be provided, for example, by a power supply, a battery, a capacitor or any other means known to a person skilled in the art. By applying the voltage V across the two electrodes, a corresponding electrical field in the electrically responsive middle compliant layer (420) affects a mechanical property of the layer (420), which as discussed above, results in a buckling of the top stiff layer (430) due to a mismatch strain between the layers (420) and (430). It should be noted that since the bottom substrate (410) is rigid, it creates a rigid base for the electrically responsive middle compliant layer (420) which prevents deformation of the middle compliant layer (420) at its bottom surface adjacent to the substrate (410). On the other hand, as the top stiff layer (430) is flexible, the mismatch strain resulting from the applied voltage V can deform the top stiff layer (430) according to the buckling effect discussed above. This can result in a number of deformation patterns as discussed above and shown in FIG. 3 depending on the thicknesses, applied voltage and materials. Of particular interest in the preferred embodiment is the periodic deformation pattern whose height (w, deflection) at a coordinate x along a direction in the plane of the surface of the top stiff layer (430), according to some embodiments, can be described by the following expression:

$$w = A \cos(kx) \quad (1)$$

where A is the amplitude of the deformation pattern and k is a wavenumber of the deformation pattern (spatial period=$2\pi/k$). Furthermore, A and k depend on a magnitude of the mismatch strain induced by the applied electric potential difference (voltage V) between the top and bottom electrodes provided by the top stiff layer (430) and the bottom rigid substrate (410) as described by the following expressions:

$$k = \left(\frac{1}{D}\left(\frac{(1-v_s)E_s}{(1+v_s)(3-4v_s)}\right)\right)^{1/3} \quad (2)$$

$$A = \sqrt{(\eta_x + v\eta_y)\frac{4}{k^2} - h^2} \quad (3)$$

where $\eta_x$, $\eta_y$ denote the two principal components of the mismatch strain, $E_s$ is the Young's modulus of the electrically responsive middle compliant layer (420), $v_s$ is the Poisson's ratio of the electrically responsive middle compliant layer (420), $v$ is the Poisson's ratio of the top stiff layer (430), D is the bending modulus of the top stiff layer (430), and h is the thickness of the top stiff layer (430). The mismatch strain $\eta_x$, $\eta_y$ are controlled by the applied electric field $E_0$=V/H where V is the applied potential difference between the two electrodes provided by the top stiff layer (430) and the bottom rigid substrate (410), and H is the thickness of the electrically responsive middle compliant layer (420).

Figure 5:
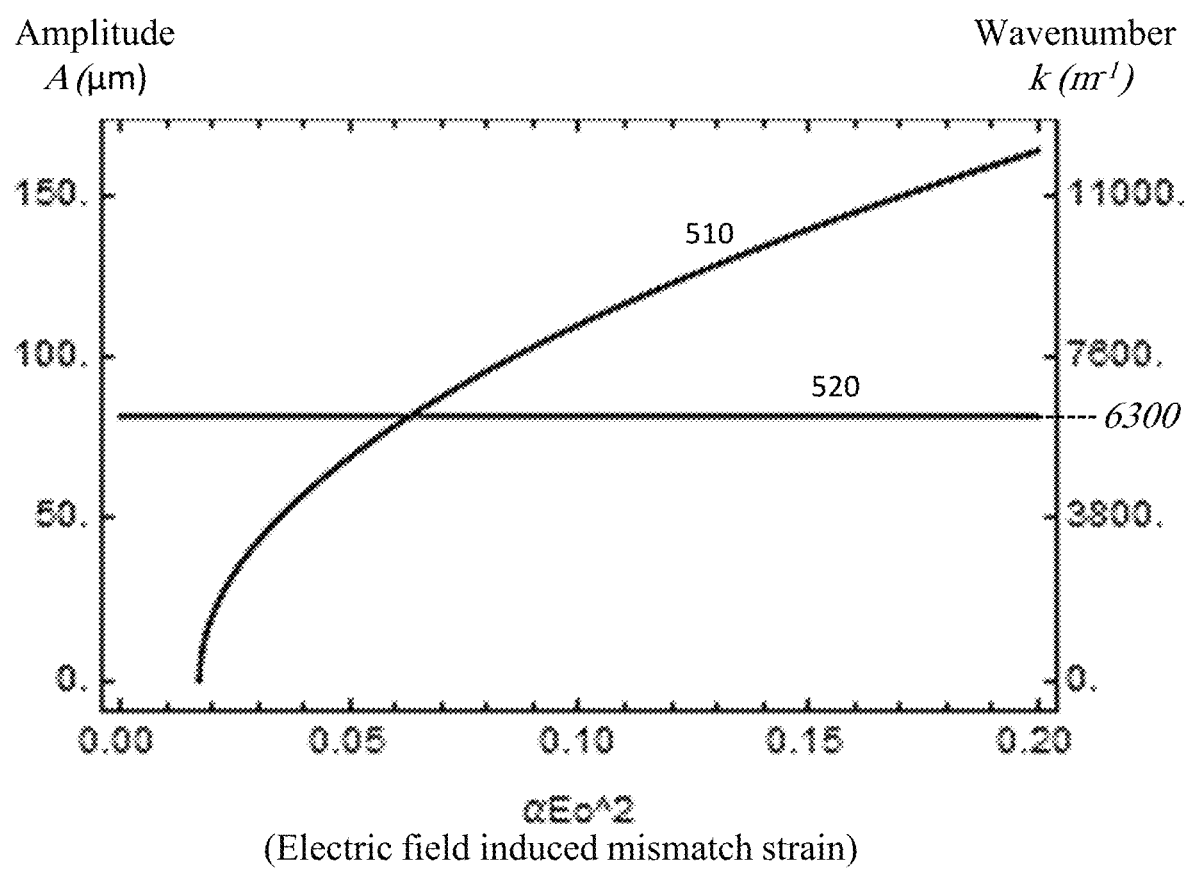
FIG. 5 shows representative curves of the amplitude A and the wavenumber of a surface deformation pattern of the multilayered active surface of FIGS. 4A and 4B as a function of an applied electric field (e.g. generated by an applied voltage across the two electrodes).

In a case where the electrically responsive middle compliant layer (420) is made of an electrostrictive polymer, characterized by a quadratic dependency of the mismatch strain with respect to an applied electric field, as provided by the expression:

$$\eta_x = \eta_y = \alpha E_0^2 \quad (4)$$

where $\alpha$ is the traverse electrostrictive coefficient, further simplification of the above expressions is possible. FIG. 5 shows representative curves of the amplitude A (510) and the wavenumber k (520) of the surface deformation pattern as a function of the square of the applied electric field ($E_0^2$). As can be seen in curves (510) and (520) of FIG. 5, a deformation pattern at a surface of the active surface structure (400) has an amplitude A which is an increasing function of the applied electric field, and has a wavenumber that is a constant value and therefore is not affected by the applied electric field (voltage across the electrodes). In other words, the surface deformation pattern has a constant spatial period irrespective of the applied electric field.

It follows that by varying the applied voltage V across the bottom rigid substrate (410) and the top stiff layer (430) of the active surface structure (400) (FIGS. 4A, 4B) of the present disclosure, the surface of the active surface structure (400) provided by the top stiff layer (430), which can be in contact with a fluid, can vary from a smooth surface (FIG. 4A), to a rough surface having a rugosity provided by a geometrical pattern of fixed spatial period (FIG. 4B) whose amplitude is dependent on the applied voltage V. Such active surface structure according to the present disclosure can therefore be used to affect interaction of a fluid with the surface, and therefore to affect instabilities which characterize the boundary layer.

As used herein, the terms "rugosity" and "surface roughness" are synonymous, and refer to a measure of small-scale variation of amplitude in a height of a surface. In the case where the surface roughness is a consequence of a buckling effect resulting to spatially periodic patterns as depicted, for example, in FIG. 3, the surface roughness can be defined by (peak) amplitude of deflections in a direction orthogonal to a plane of the surface and a spatial periodicity of such deflections, as provided, for example, in FIG. 5, and FIGS. 7A and 7B later described. Considering the multilayered active surface according to the present disclosure, typical values of the amplitudes of the deflections are in the order of 0 μm for a smooth surface, to high values of about 10's to 100's of μm, and typical values of the spatial period is in the range of 100's to 10,000's μm (i.e., 100's to 10,000's of bumps (cycles) per meter).

With further reference to the multilayered active surface (400) of FIGS. 4A and 4B, according to some exemplary embodiments of the present disclosure, amplitude of the deflections can be controlled to be in a range of 0-200 μm, and the corresponding spatial period can be controlled to be in range of 100-3000 μm. Considering the exemplary amplitude curve (510) of FIG. 5, one can see that the amplitude A of the deflections at the top surface (430) of the multilayered active surface (400) can be controlled to be in a range of 0 μm (no electrical field applied) to about 150 μm (for a high value of the electrical field), whereas a corresponding spatial wavenumber (curve (520)) remains fixed at a value of about 6300 meter$^{-1}$. Other fixed values of the spatial wavenumber can be obtained as function of different parameters of the multilayered active surface (400).

A further embodiment of a multilayer active surface (600) according to the present disclosure, which similarly to the multilayered active surface (400) uses an electrically responsive material as means to control characteristics of deformations on the surface, is depicted in FIGS. 6A and 6B. As can be seen in FIGS. 6A and 6B, the multilayer active surface (600) according to the present disclosure comprises a bottom rigid substrate (610) acting as a bottom electrode, a middle compliant layer (620) made of, for example, a dielectric elastomer, and a top stiff layer (630) acting as a top electrode, where a pre-stretch is applied to a middle compliant layer (620) relative to the top stiff layer (630) during a fabrication step of the multilayer active surface (600). In one non limiting example, the pre-stretch can be provided by fabricating the multilayer active surface (600) at a high temperature and allowing it to cool to create the pre-stretch. A person skilled in the art will know of different methods by which such pre-stretch can be realized and which are outside the scope of the present application.

According to some non-limiting exemplary embodiments of the present disclosure, the top stiff layer (630) of the multilayered active surface (600) can be made of a metal, such as copper, nickel and aluminum, or of any other metal or conductive material known to a person skilled in the art. Same such materials can also be used for the bottom rigid substrate (610), although layers (610) and (630) may be made of different such materials. It should be noted that the bottom rigid substrate (610) can represent part of the main body of a vehicle (e.g. a wing, a fuselage, a spoiler) using the multilayered active surface (600). According to some exemplary embodiments the body is not entirely made of conductive material and the bottom rigid substrate (610) can represent a conductive layer of the body.

According to further non-limiting exemplary embodiments of the present disclosure, the electrically responsive material used for the middle compliant layer (620) of the multilayered active surface (600) can be a dielectric elastomer or a silicone rubber as known to a person skilled in the art.

According to some exemplary embodiments of the present disclosure a thickness of the top stiff layer (630) is in a range of about 1-100 μm, a thickness of the middle compliant layer (620) is in a range of about 1-100 mm, and a thickness of the bottom rigid substrate (610) is in a range of about 0.1-10 mm, or alternately, in a range of 0.1-1000 mm. According to further exemplary embodiments of the present disclosure, a ratio between a thickness of the top stiff layer (430) and a thickness of the middle compliant layer (420) can be in a range of values between ¹⁄₁₀ to ¹⁄₁₀₀.

With reference to the multilayer active surface (600) of the present disclosure depicted in FIG. 6A, at rest, where an electric potential difference between the two electrodes is zero, compressive stresses resulting from the pre-stretch of the middle compliant layer (620) relative to the top stiff layer (630), create buckling of the top stiff layer (630) according to the same principles as described with respect to the multilayer structure (200) discussed above, thus resulting in one of the different types of deformations shown in FIG. 3. This configuration is shown in FIG. 6A, where the absence of an externally applied voltage indicates a zero electric potential difference between the two electrodes.

FIG. 6B shows the multilayer active surface (600) of the present disclosure activated by an external voltage which provides a non-zero electric potential difference between the two layers (610) and (630) which serve as electrodes. A person skilled in the art will understand that such external voltage generates an electric field in the middle compliant layer (620). According to an embodiment of the present disclosure the middle compliant layer can be made of an dielectric elastomer material, and therefore such electric field can create an electric displacement in the dielectric elastomer of the middle compliant layer (620). In turn, such electric displacement can result in an added exerted stress to the top stiff layer (630) which can further affect the buckling effect. In particular, for a given deformation pattern of the top stiff layer (630), applicant of the present disclosure has found that a corresponding amplitude A and wavenumber k can be provided by the following expressions:

$$k = \left( \left( \frac{(1-v_s)E_s}{(1+v_s)(3-4v_s)} - \frac{1}{2}\left(\epsilon_0 + \frac{1}{\alpha}\right)E_0^2 \right) \frac{1}{D} \right)^{1/3} \quad (5)$$

$$A = \sqrt{(\eta_x + v\eta_y)\frac{4}{k^2} - h^2} \quad (6)$$

where $\eta_x$, $\eta_y$ denote the two principal components of the mismatch strain, $E_s$ is the Young's modulus of the dielectric elastomer material of the middle layer (620), $v_s$ is the Poisson's ratio of the dielectric elastomer material of the middle layer (620), $v$ is the Poisson's ratio of the top stiff layer (630) material, D is the bending modulus of the top stiff layer (630) material, h is the thickness of the top stiff layer (630), and $E_0$ is the applied electric field. It should be noted that the above expressions were derived using an analytic approach and verified by commercially available finite element analysis tools.

Figure 7A:
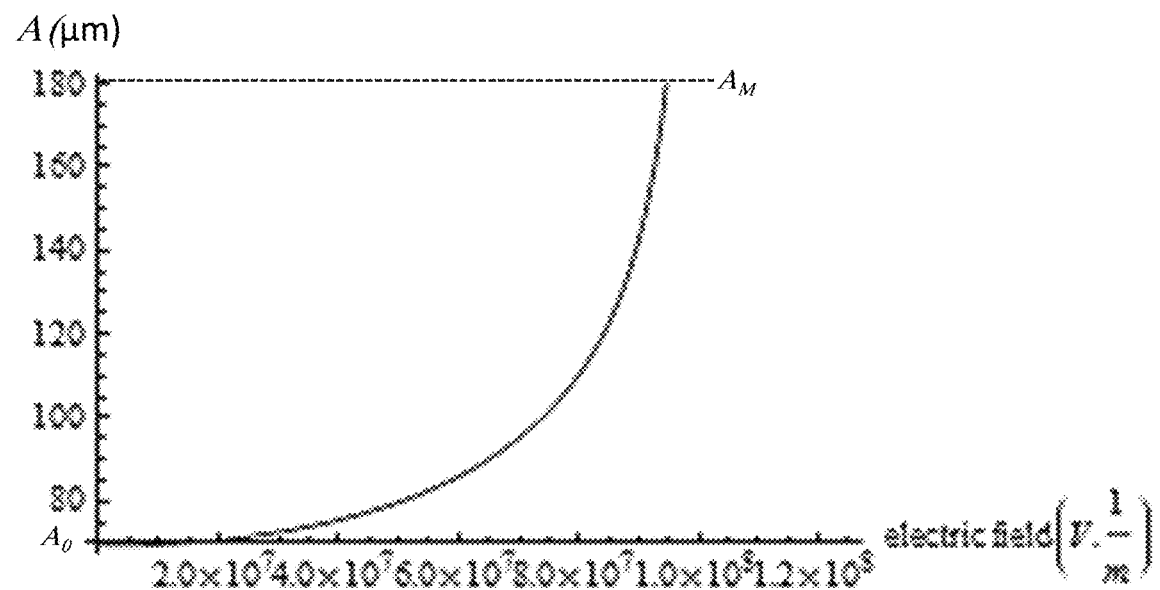
FIGS. 7A and 7B respectively show representative curves of the amplitude A and the wavenumber k of a surface deformation pattern of the multilayered active surface structure of FIGS. 6A and 6B, as a function of an applied electric field to the multilayered active surface structure (e.g. generated by an applied voltage across the two electrodes).
Figure 7B:
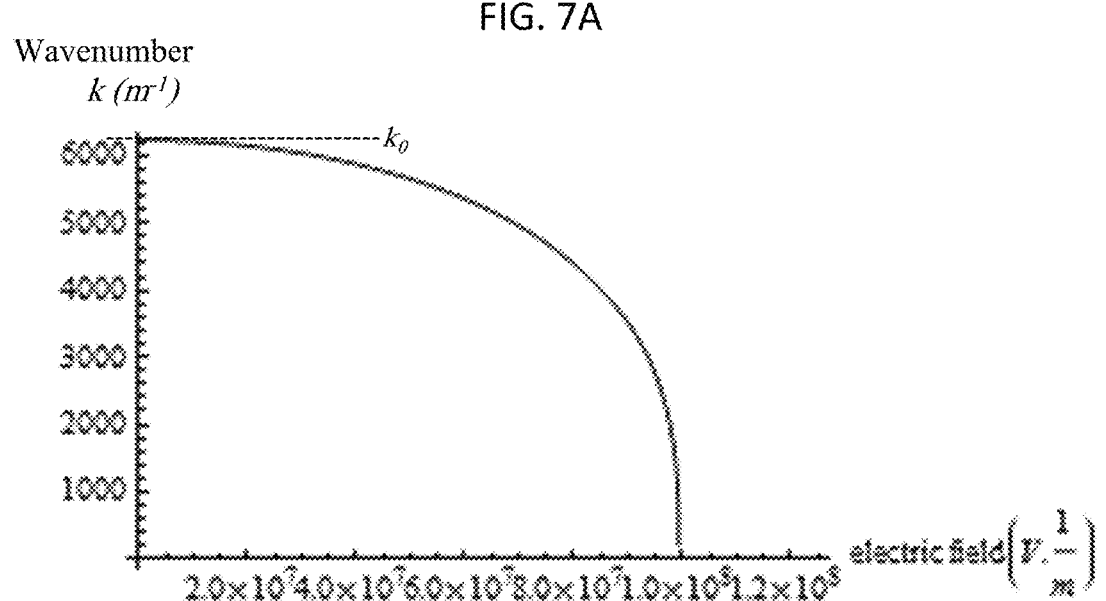

FIGS. 7A and 7B respectively show representative curves of the amplitude A and the wavenumber k of the surface deformation pattern as a function of an applied electric field to the active surface structure (600) of the present disclosure. A deformation pattern at the top stiff layer (630) of the active surface structure (600) has a non-zero amplitude $A_0$ (see FIG. 7A) at a given wavenumber $k_0$ (see FIG. 7B) when the applied electric field is zero. As discussed above, $A_0$ and $k_0$ define the buckling effect due to the pre-stretch condition of the middle compliant layer (620). As can be seen in the curves of FIGS. 7A and 7B, as the electric field increases, the amplitude A increases and the wavenumber k decreases (therefore the spatial period $2\pi/k$ increases). In particular, it is noted that with higher values of the electric field, the wavenumber k can be reduced to a value close to zero (therefore the spatial period becomes infinite), thus making the surface substantially smooth. As can be seen in the curves of FIGS. 7A and 7B, the active surface (600) of the present disclosure can be electrically controlled to change the amplitude and the frequency (spatial periodicity) of a deformation pattern at the top stiff layer (630), starting from an amplitude $A_0$ and a wavenumber $k_0$ provided by a buckling effect of the top stiff layer (630) due to the pre-stretched middle layer (620).

Considering the exemplary amplitude curve of FIG. 7A, one can see that the amplitude A of the deflections at the top surface (630) of the multilayered active surface (600) can be controlled to be in a range of about 70 μm (value of $A_0$, where no electrical field is applied) to about 180 μm (for a high value of the electrical field), whereas a corresponding spatial wavenumber, depicted in the curve of FIG. 7B, can be controlled to be in a range of about 6300 cycles per meter, equivalent to a spatial period of 1000 μm (value $k_0$, where no electrical field is applied) to about 0 cycles per meter, equivalent to an infinite spatial period (effectively providing a smooth surface).

It follows that by varying the applied voltage V across the bottom rigid substrate (610) and the top stiff layer (630) of the active surface structure (600) (FIGS. 6A, 6B) of the present disclosure, the surface of the active surface structure (600) provided by the top stiff layer (630), which can be in contact with a fluid, can vary from a rough surface having a rugosity (FIG. 6A, $A_0$, $k_0$ of FIGS. 7A-7B) provided by a buckling effect due to the pre-stretched middle compliant layer (620), to a smooth surface (FIG. 6B and FIG. 7A for high values of the electric field), where both an amplitude and a period of surface deformation patterns can be controlled. Such active surface structure (600) according to the present disclosure can therefore be used to affect interaction of a fluid with the surface, and therefore to affect instabilities which characterize the boundary layer.

As noted above, the multilayered active surface (400, 600) according to the present disclosure can be used as a means to control instabilities of a boundary layer resulting from interaction of a surface of a vehicle and a fluid flow by application of a potential difference between the two electrode layers (410/610, 430/630) of the multilayered active surface. As known to a person skilled in the art, and as shown, for example, in the exemplary flow streamlines of the aircraft in FIG. 1, different parts of a surface of the vehicle can be subjected to different types of instabilities of a corresponding boundary layer, which therefore may require different types of controls as provided by a multilayered active surface according the present disclosure. It follows, that according further embodiments of the present disclosure, a surface of a vehicle subjected to a fluid flow is divided into surface regions susceptible to different instabilities, where each of such surface regions is a separate multilayered active surface (400, 600) so as to allow independent control, as shown in the exemplary FIG. 8.

Figure 8:
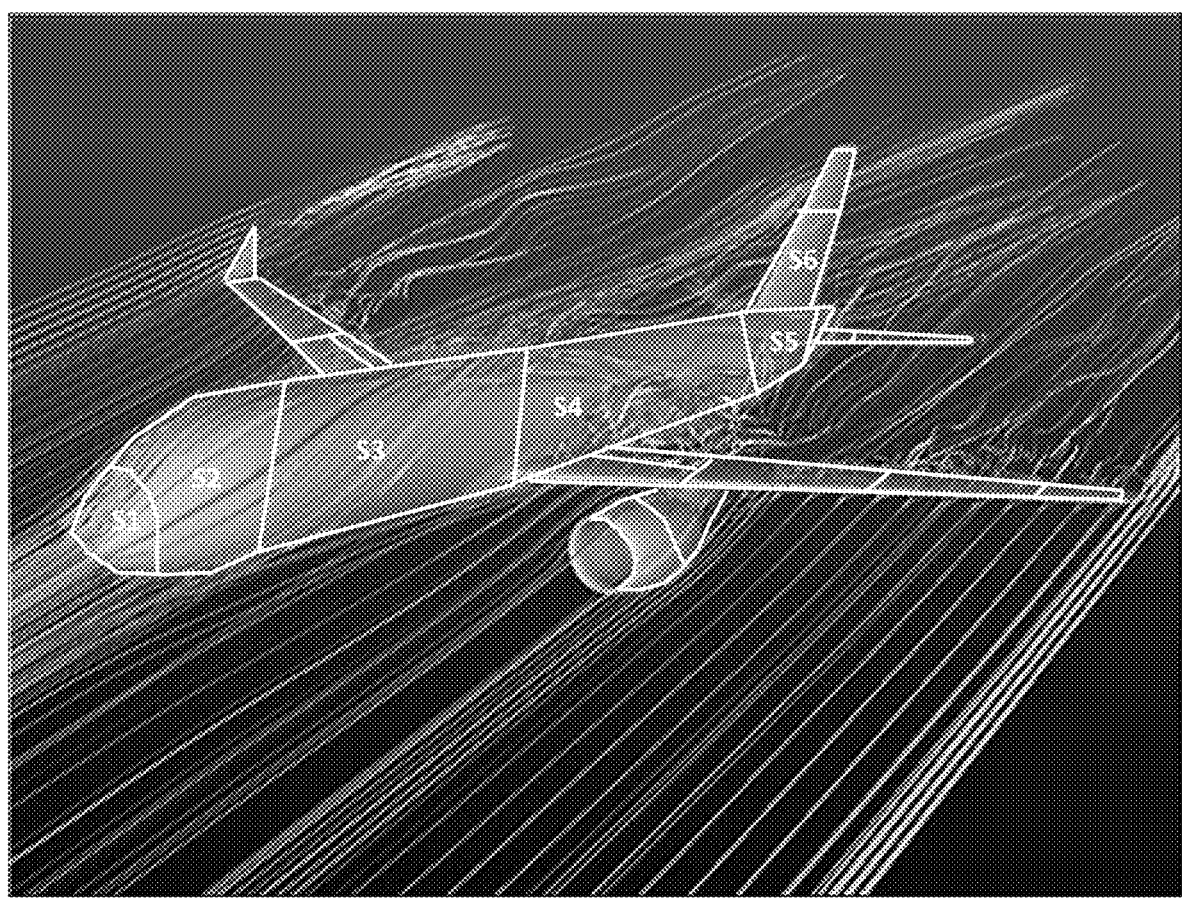
FIG. 8 shows a vehicle subjected to a fluid flow whose surface is partitioned in a plurality of active surfaces according to the multilayered active surfaces of FIGS. 4 and 6 so as to allow independent control of surface region specific instabilities due to a corresponding boundary layer.

With further reference to FIG. 8, a vehicle (aircraft) subjected to a fluid flow is shown, where the surface of the vehicle comprises a plurality of separate surface regions (e.g. S1, S2, S3 . . . ), each surface region of the plurality of surface regions being formed by a multilayered active surface (400, 600) according to the present disclosure. Accordingly, a surface rugosity of each separate active surface (S1, S2, S3 . . . ) is controlled independently (as per control of surface of (400, 600) described above) so as to allow independent control of surface region specific to instabilities due to corresponding boundary layer. Electrodes of each region (S1, S2, S3 . . . ) are therefore associated to a separate and possibly different electric potential difference generated, for example, by way of a different voltage source coupled to the electrodes. Alternately, the voltage source can be unique, and circuitry can be designed to provide different independent voltages to each pair of electrodes of the separate active surfaces (S1, S2, S3 . . . ) based on the unique voltage source. According to some embodiments of the present disclosure, sensors/transducers can be mounted on the vehicle which can sense characteristics of the fluid flow (e.g. relative velocity, pressure, etc.), and a controller aware of the sensed characteristics, can accordingly control surface rugosity of each of the separate active surfaces (S1, S2, S3 . . . ) of the vehicle so as to affect surface specific instabilities. Given the basic control of each of the separate active surfaces (S1, S2, S3 . . . ) provided by the embodiment of the present disclosure, a person skilled in the art will know of a variety of techniques and derived algorithms to control boundary layer instabilities of a vehicle (e.g. as depicted in FIG. 8) which can be based on open loop, closed loop, or a combination of open and closed loop.

The examples set forth above are provided to give those of ordinary skill in the art a complete disclosure and description of how to make and use the embodiments of the dielectric materials for turbulent boundary layer control, and are not intended to limit the scope of what the inventors regard as their disclosure. Modifications of the above-described modes for carrying out the disclosure may be used by persons of skill in the art, and are intended to be within the scope of the following claims. All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

LIST OF REFERENCES

[1] Chen, S. Y., Chen, Y., Xia, Z., Qu, K., Shi, Y., Xiao, Z., Liu, Q., Cai, Q., Liu, F., Lee, C., Zhang, R. & Cai, J. 2013 Constrained large-eddy simulation and detached eddy simulation of flow past a commercial aircraft at 14 degree angle of attack. *Science China Physics, Mechanics and Astronomy* 56 (2), pp 270-276.

[2] Bushnell, D. M., Hefner, J. N. & Ash, R. L. 1977 Effect of compliant wall motion on turbulent boundary layers. *Phys Fluids* 20, S31-S48.

[3] Choi, K. S., Yang, X., Clayton, B. R., Glover, E. J., Altar, M., Semenov, B. N. & Kulik, V. M. 1997 Turbulent drag reduction using compliant surfaces. *Proc. R. Soc. Lond.* A 4453(1965), 2229-2240.

[4] Gad-El-Hak, M. 2002 Compliant coatings for drag reduction. *Progress in Aerospace Sciences* 38, 77-99.

[5] Kramer, M. O. 1957 Boundary layer stabilisation by distributed damping. *J. Aero. Sci.* 24, 459-460.

[6] Carpenter, P. W. 1987 The optimization of compliant surfaces for transition delay. In *Turbulence management and relaminarisation* (ed H. W. Liepmann & R. Narasimha), pp. 305-313 Springer-Verlag, Berlin, Heidelberg, New York.

[7] Luhar, M., Sharma, A. S. & McKeon, B. J. 2015 A framework for studying the effect of compliant surfaces on wall turbulence. *J. Fluid Mech* 768, 415-441.

[8] Suo, Z., 2010. Theory of dielectric elastomers. *Acta Mech. Solida Sinica* 23(6), pp. 549-578.

[9] Dorfmann, L. & Ogden, R. W. 2010 Nonlinear electroelastostatics: Incremental equations and stability. *Int J Eng Sci* 48, pp. 1-14.

[10] Suo, Z., Zhao, X. & Greene, W., H. 2008 A nonlinear field theory of deformable dielectrics. *J. Mech. Phys. Solids* 56 pp 467-486.

[11] Tian, L., 2007. Effective Behavior of Dielectric Elastomer Composites. Ph.D. Thesis, California Institute of Technology.

[12] Zheng, L., 2008. Wrinkling of dielectric elastomer membranes. Ph.D. Thesis, California Institute of Technology.

[13] Allen, H. G., 1969 Analysis and Design of Structural Sandwich Panels. Pergamon Press, New York.

[14] Chen, X., Hutchinson, J. W. 2004 Herringbone buckling patterns of compressed thin films on compliant substrates. *J. Appl. Mech.* 71, pp. 597-603.

[15] Audoly, B., Boudaoud, A. 2008a Buckling of a thin film bound to a compliant substrate—Part I: Formulation, linear stability of cylindrical patterns, secondary bifurcations. *J. Mech. Phys. Solids*, doi:10.1016/j.jmps.2008.03.003.

[16] Audoly, B., Boudaoud, A. 2008a Buckling of a thin film bound to a compliant substrate—Part II: A global scenario for the formation of herringbone pattern. *J. Mech. Phys. Solids*, doi:10.1016/j.jmps.2008.03.002.

[17] Audoly, B., Boudaoud, A. 2008b Buckling of a thin film bound to a compliant substrate—Part III: Herringbone solutions at large buckling parameter. *J. Mech. Phys. Solids*, doi:10.1016/j.jmps.2008.03.001.

[18] Timoshenko, S. P., and Gere, J. M., 1961, Theory of Elastic Stability, McGraw-Hill, New York.

[19] Bar Cohen, Y., 2004, *Electroactive Polymer (EAP) Actuators as Artificial Muscles: Reality, Potential, and Challenges*, Second Edition, SPIE Publications.

[20] Zhang, Q. M., Bharti, V. and Zhao, X., 1998, Giant electrostriction and relaxor ferroelectric behavior in electron-irradiated poly(vinylidene uoride-triuoroethylene) copolymer, *Science* 280: 2101-2104.

[21] Thomsen, D. L., Keller, P., Naciri, J., Pink, R., Jeon, H., Shenoy, D. and Ratna, B. R., 2001, Liquid crystal elastomers with mechanical properties of a muscle, *Macromolecules* 34: 5868-5875

[22] Mazur, P. and Bhattacharya, K., 2016 Exploiting buckling for active surfaces, In preparation.

The invention claimed is:

1. A multilayered active surface configured to permit control of instabilities of a boundary layer of a fluid flow, comprising:
    a top stiff layer comprising a conductive material, the top stiff layer configured to present a surface to the fluid flow;
    a middle compliant layer comprising an electroactive polymer; and
    a bottom rigid substrate comprising a conductive material,
    wherein the top stiff layer and the bottom rigid substrate are coupled to a voltage source, and
    wherein the multilayered active surface is configured such that responsive to application of an electric potential difference through the voltage source between the top stiff layer and the bottom rigid substrate, a rugosity of said surface is modified to permit the control of the instabilities of the boundary layer, and
    wherein the electroactive polymer of the middle compliant layer is a pre-stretched electroactive polymer to create a buckling of the top stiff layer for a zero value of the applied electric potential difference, the buckling providing the rugosity of the surface.

2. The multilayered active surface according to claim 1, wherein the buckling is defined by an amplitude and a spatial period.

3. The multilayered active surface according to claim 2, wherein a value of the amplitude of the buckling is in a range of 0 μm to 200 μm and a value of the spatial period of the buckling is in a range 100-3000 μm.

4. The multilayered active surface according to claim 1, wherein responsive to a varying value of the applied electric potential difference, a spatial period of the rugosity remains constant.

5. The multilayered active surface according to claim 1 wherein the buckling is defined by an amplitude and a spatial period, both a value of the amplitude and a value of the spatial period varying as a function of a varying value of the applied electric potential difference.

6. The multilayered active surface according to claim 5, wherein responsive to an increasing value of the applied electric potential difference, the value of the amplitude increases monotonously and the value of the spatial period increases monotonously.

7. The multilayered active surface according to claim 6, wherein the value of the spatial period becomes infinite for a high value of the applied electric potential difference, thereby the top stiff layer presenting a smooth surface to the fluid flow.

8. The multilayered active surface according to claim 6, wherein the value of the amplitude and the value of the spatial period for a zero value of the applied electric potential difference are adjusted to desired values based on a pre-stretch value of the pre-stretched electroactive polymer.

9. The multilayered active surface according to claim 8, wherein the value of the amplitude of the buckling is in a range of 70 μm to 180 μm and a value of the spatial period of the buckling is in a range of 1000 μm to infinite μm.

10. The multilayered active surface according to claim 1, wherein a ratio of a thickness of the top stiff layer to a thickness of the middle compliant layer is in a range of 1/10 to 1/100.

11. The multilayered active surface according to claim 1, wherein the conductive material comprises a metal.

12. The multilayered active surface according to claim 1, wherein the conductive material comprises one of: a) copper, b) nickel, and c) aluminum.

13. The multilayered active surface according to claim 1, wherein the electroactive polymer comprises one of: a) a ferroelectric polymer, and b) a liquid crystal elastomer.

14. The multilayered active surface according to claim 13, wherein the ferroelectric polymer comprises polyvinylidene difluoride (PVDF).

15. The multilayered active surface according to claim 13, wherein the liquid crystal elastomer comprises on of:
   a) 4'-acryloyloxy butyl 2,
   b) 5-(4'-butyl oxy benzoyloxy)benzoate,
   c) 4'-acryloyloxy butyl 2, and
   d) 5-di(4'-butyloxybenzoyloxy)benzoate.

16. The multilayered active surface according to claim 1, wherein the electroactive polymer comprises one of: a) a dielectric elastomer, and b) silicone rubber.

17. The multilayered active surface according to claim 1, wherein the voltage source is a variable voltage source coupled between the conductive material of the top stiff layer and the conductive material of the bottom rigid substrate, the variable voltage source configured to vary a value of the applied electric potential difference.

18. The multilayered active surface according to claim 1, wherein the control of the instabilities of the boundary layer comprises one or more of: a) a boundary layer state, b) a transition advance, c) a transition delay, d) a heat transfer, e) a scalar mixing, and f) a skin friction drag.

19. A surface of a vehicle configured to be subjected to a fluid flow, the surface comprising:
   a plurality of separate surface regions, each of the plurality of separate surface regions comprising a multilayered active surface according to claim 1.

20. A method for controlling instabilities of a boundary layer of a fluid flow, the method comprising:
   providing a multilayered electromechanical structure comprising a middle electroactive polymer layer, a top stiff electrode layer and a bottom rigid electrode substrate;
   applying an electrical potential difference between the top stiff electrode and the bottom rigid electrode substrate;
   based on the applying, affecting a rugosity of a surface of the multilayered electromechanical structure;
   presenting the surface of the multilayered electromechanical structure to the fluid flow;
   based on the presenting, obtaining instabilities of a boundary layer;
   changing the applied electrical potential difference;
   based on the changing, modifying the rugosity of the surface; and
   based on the modifying, controlling the instabilities of the boundary layer,
   wherein the modifying of the rugosity comprises providing a smooth surface based on a zero value of the applied electrical potential difference and increasing an amplitude of the rugosity based on an increasing value of the applied electrical potential difference.

21. The method according to claim 20, wherein the controlling of the instabilities of the boundary layer comprises controlling of one or more of: a) a boundary layer state, b) a transition advance, c) a transition delay, d) a heat transfer, e) a scalar mixing, and f) a skin friction drag.

22. The method according to claim 20, wherein the affecting and the modifying of the rugosity comprises affecting and modifying of amplitude values and spatial period values of a buckling of the top stiff electrode layer.

23. The method according to claim 20, wherein the affecting and the modifying of the rugosity comprises affecting and modifying of amplitude values of a buckling of the top stiff electrode layer.

24. The method according to claim 20, wherein the modifying of the rugosity comprises:
   providing a smooth surface based on a high value of the applied electrical potential difference,
   increasing an amplitude of the rugosity based on a decreasing value of the applied electrical potential difference, and
   decreasing an amplitude of the rugosity based on the decreasing value of the applied electrical potential difference.

25. A method for manufacturing a multilayered active surface configured to permit control of instabilities of a boundary layer of a fluid flow, the method comprising:
   providing a top stiff layer comprising a conductive material, the top stiff layer configured to present a surface to the fluid flow;
   providing a middle compliant layer comprising an electroactive polymer; and
   providing a bottom rigid substrate comprising a conductive material,
   forming the multilayered active surface comprising the top stiff layer, the middle compliant layer, and the bottom rigid surface,
   wherein the top stiff layer and the bottom rigid substrate are coupled to a voltage source,
   wherein the multilayered active surface is configured such that responsive to application of an electric potential difference through the voltage source between the top stiff layer and the bottom rigid substrate, a rugosity of said surface is modified to permit the control of the instabilities of the boundary layer, and pre-stretching the electroactive polymer of the middle compliant layer to create a buckling of the top stiff layer for a zero value of the applied electric potential difference, the buckling providing the rugosity of the surface.

26. A method for controlling instabilities of a boundary layer of a fluid flow, the method comprising:
   partitioning a surface of a vehicle in a plurality of separate surfaces;
   for each of the plurality of separate surfaces:
   i) providing a multilayered electromechanical structure comprising a middle electroactive polymer layer, a top stiff electrode layer and a bottom rigid electrode substrate;
   ii) applying an electrical potential difference between the top stiff electrode and the bottom rigid electrode substrate;
   iii) based on the applying, affecting a rugosity of a surface of the multilayered electromechanical structure;
   presenting the surface of the vehicle to the fluid flow, thereby, for each of the plurality of separate surfaces, presenting the surface of the multilayered electromechanical structure to the fluid flow;
   based on the presenting, obtaining instabilities of a boundary layer associated to each of the plurality of separate surfaces;
   for each of the plurality of separate surfaces, changing the applied electrical potential difference;
   based on the changing, modifying the rugosity of each of the plurality of separate surfaces, thereby modifying a rugosity of the surface of the vehicle; and
   based on the modifying, controlling the instabilities of the boundary layer associated to each of the plurality of surfaces, thereby controlling the instabilities of the surface of the vehicle,
      wherein the modifying of the rugosity of each of the plurality of separate surfaces comprises providing a smooth surface based on a zero value of the applied electrical potential difference and increasing an amplitude of the rugosity based on an increasing value of the applied electrical potential difference.

27. A multilayered active surface configured to permit control of instabilities of a boundary layer of a fluid flow, comprising:
   a top stiff layer comprising a conductive material, the top stiff layer configured to present a surface to the fluid flow;
   a middle compliant layer comprising an electroactive polymer; and
   a bottom rigid substrate comprising a conductive material,
   wherein the top stiff layer and the bottom rigid substrate are coupled to a voltage source,
   wherein the multilayered active surface is configured such that responsive to application of an electric potential difference through the voltage source between the top stiff layer and the bottom rigid substrate, a rugosity of said surface is modified to permit the control of the instabilities of the boundary layer,
   wherein the multilayered active surface is configured to provide a smooth surface based on a zero value of the applied electric potential difference and an increasing amplitude of the rugosity based on an increasing value of the applied electric potential difference, and
   wherein the electroactive polymer of the middle compliant layer is a pre-stretched electroactive polymer to create a buckling of the top stiff layer for a zero value of the applied electric potential difference, the buckling providing the rugosity of the surface.

28. The multilayered active surface according to claim 27, wherein the buckling is defined by an amplitude and a spatial period, both a value of the amplitude and a value of the spatial period varying as a function of a varying value of the applied electric potential difference.

29. The multilayered active surface according to claim 28, wherein responsive to an increasing value of the applied electric potential difference, the value of the amplitude increases monotonously and the value of the spatial period increases monotonously.

30. The multilayered active surface according to claim 29, wherein the value of the spatial period becomes infinite for a high value of the applied electric potential difference, thereby the top stiff layer presenting a smooth surface to the fluid flow.

31. The multilayered active surface according to claim 29, wherein the value of the amplitude and the value of the spatial period for a zero value of the applied electric potential difference are adjusted to desired values based on a pre-stretch value of the pre-stretched electroactive polymer.

* * * * *